Patented Apr. 21, 1931

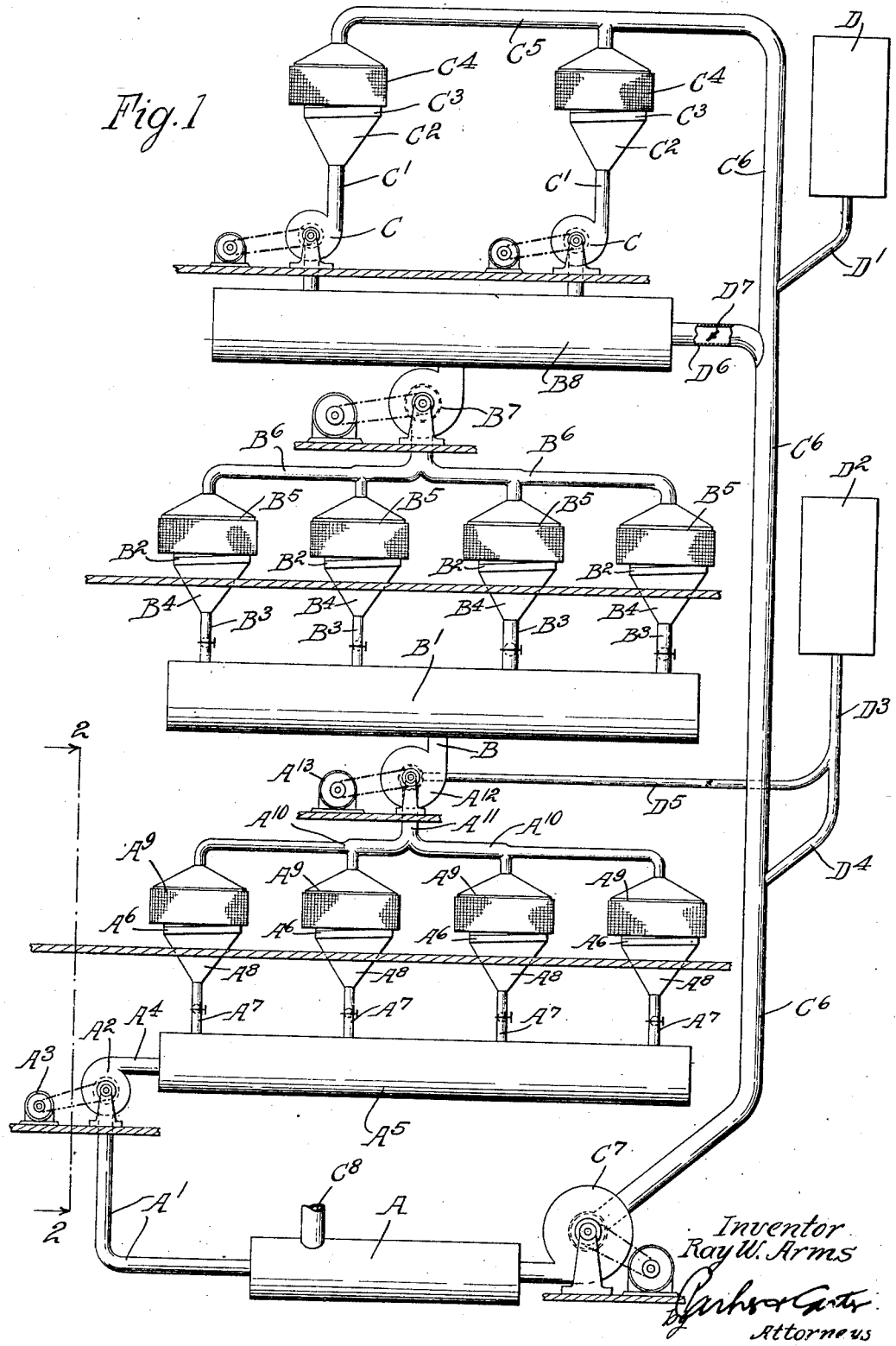

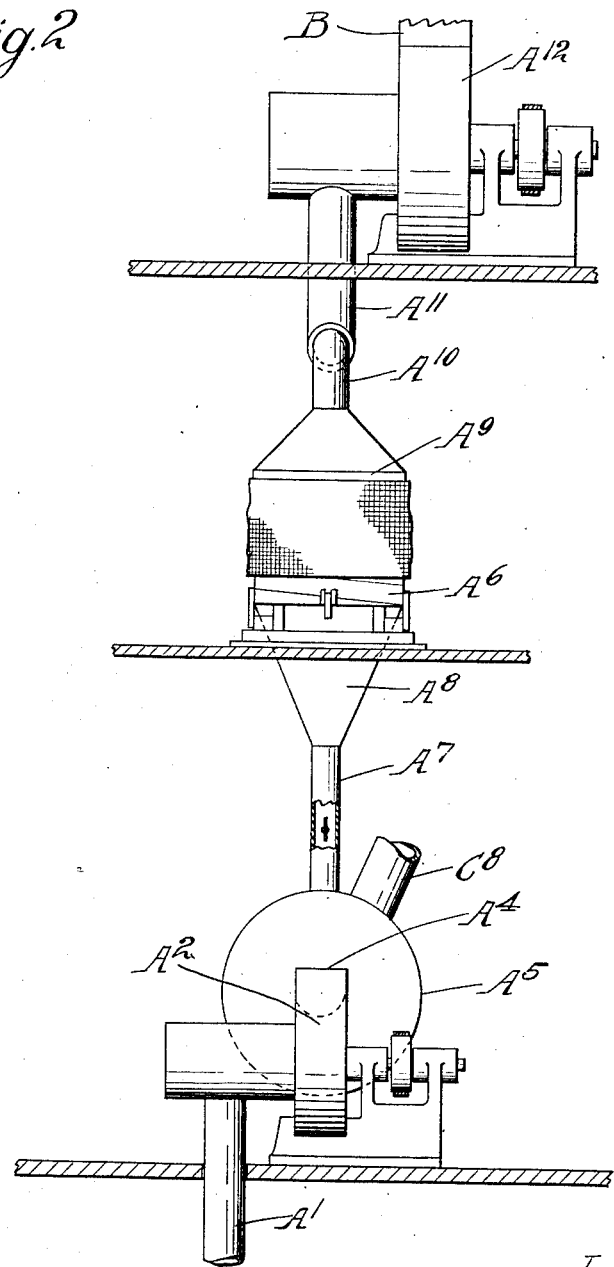

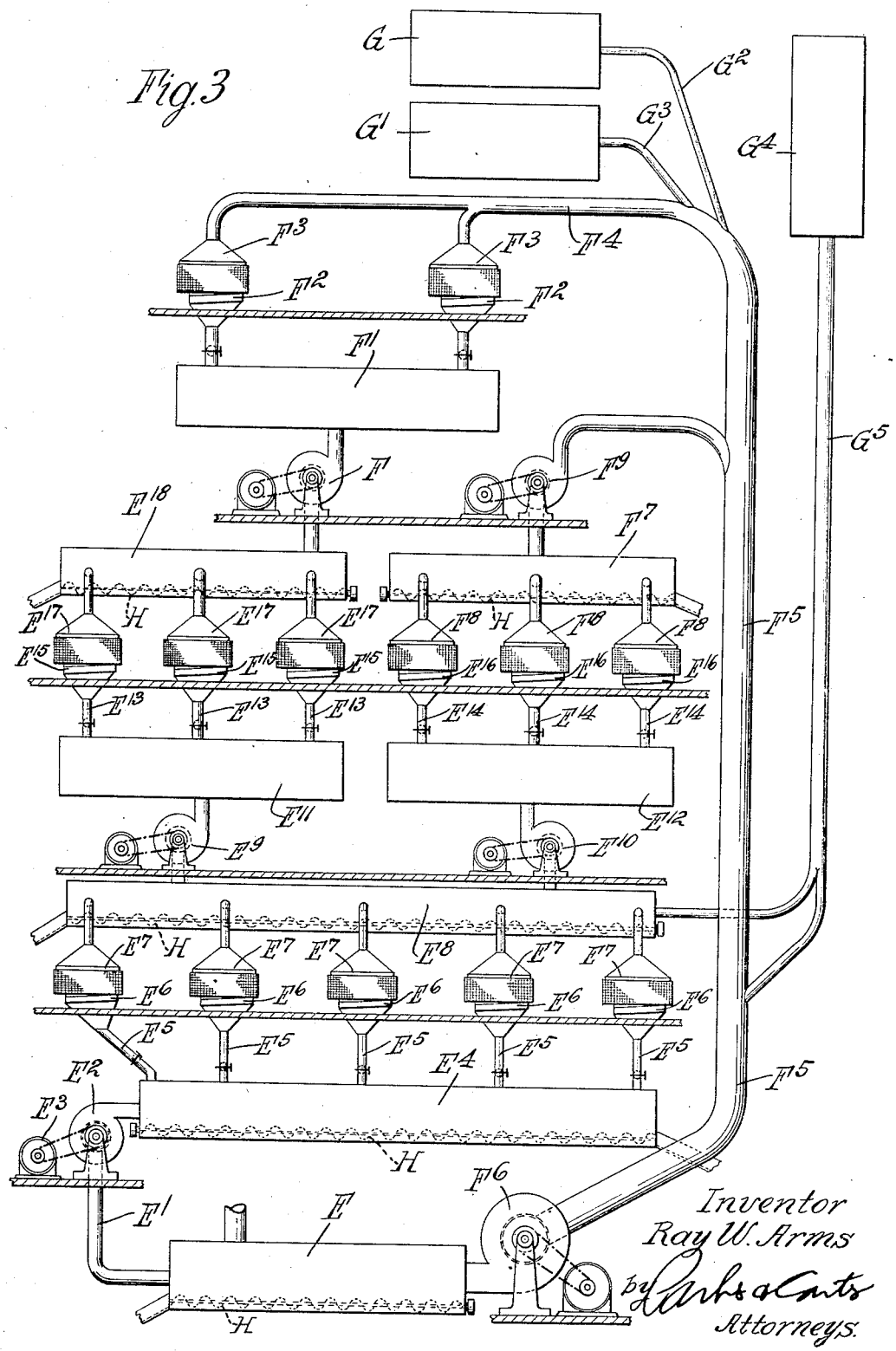

1,801,255

UNITED STATES PATENT OFFICE

RAY W. ARMS, OF CHICAGO, ILLINOIS, ASSIGNOR TO ROBERTS AND SCHAEFER COMPANY, OF CHICAGO, ILLINOIS, A CORPORATION OF ILLINOIS

DUST-COLLECTING SYSTEM FOR COAL-HANDLING PLANTS

Application filed August 24, 1923. Serial No. 301,740.

My invention relates to dust handling system for coal cleaning plants and has for one object to provide a new and improved system whereby the air used in connection with air cleaning tables in the plant may be supplied and distributed to the tables and whereby all of the dust laden air discharged from the tables may be disposed of and freed from dust with a minimum power requirement. Another object is to provide in a coal handling plant an apparatus which will handle substantially all of the dust developed in the operation of the plant whether it comes from coal cleaning tables or from other sources so as to provide a substantially dustless coal handling plant.

In general I propose to provide a series of batteries of air cleaning tables, all the tables in each battery preferably handling coal of the same general size and having the same general air requirement but the tables in different batteries handling coal of considerably different sizes and having considerably different air requirements though under some circumstances the limitation as regards size and air requirements of the table in any particular battery may be dispensed with, in which case we would have a series of different batteries having different air requirements and handling different sized coal.

I propose to associate with each battery no matter what its character and no matter what the air requirement of the battery is a plenum chamber which is merely a relatively large size chamber through which air circulates at relatively low velocity. The working air for each table in the battery will be supplied from this plenum chamber, the pressure in the plenum chamber being provided by a single fan, pump or blower.

Preferably the plenum chamber which supplies air to the battery handling the finest coal will receive its air supply from the outside atmosphere or from the dust collector. The plenum chamber for the other batteries will receive dust laden air drawn from hoods enclosing the tables of the preceding battery and such plenum chambers will serve also as settling chambers being preferably equipped with a screw conveyor at the bottom which will take out the large particles settled out from the dust laden air.

Each table will be provided with a hood and the air will be drawn from this hood into the next plenum chamber but since it is necessary to have openings between the hood and the table to permit workmen to inspect the operation and to permit coal to pass to and be discharged from the table, there will always be a certain amount of clearance and the suction pipe that leads from the hood to the plenum chamber will draw in the spent dust laden air which is passed up through the deck plus a certain amount of make-up air approximately perhaps twenty percent of the total.

The air requirement of each succeeding battery is generally greater than the air requirement of the preceding battery and if the make-up air that is drawn in around the hood is sufficient, no further attention is required. If, however, it is not sufficient, I propose to discharge into that plenum chamber dust laden air from some other source as for instance from the classifying screen or from bucket elevators, conveyor lines or any other place about the plant where dust laden air may be found. If on the other hand, the air requirement for a succeeding battery is less than for a preceding battery, I will discharge air from the succeeding plenum chamber to the dust line leading to the dust collector.

The dust laden air from the hood enclosing the last battery in the series is conducted by the dust line to the dust separator and into this dust line will also discharge dust laden air from any of the sources of dust laden air other than the tables above referred to which may be left over after the system has been balanced.

Of course, the passages leading to and from each deck and the passages leading into the plenum chambers or the dust line from the other sources of dust laden air will be equipped with control valves so that the operator may adjust and manipulate the system to produce satisfactory balanced operation.

In general, we will then have a system where air is under pressure only between the blower through the passage leading therefrom to the plenum chamber and through the passages leading from the plenum chambers to the deck. This system can and must be made dust and air tight as otherwise dust will escape to the room. All other parts of the system are under suction and so any leakage merely results in adding to the amount of air which must be handled but does not result in the discharge of dust out of the system. This applies not merely to the tables but to screens, conveyors and other elements of the system so that all the dust which would otherwise be present in the air in the working part of the house and causes the possibility of a dangerous dust situation or make working conditions unpleasant will be avoided.

Experience shows that by this re-use of the air the total power required to handle dust laden air after its work has been done, and the capacity of the dust collector required to take the dust out of the air is reduced to a minimum. This latter is especially important because the size and expense of the dust collector depends not upon the amount of dust present but upon the total volume of air which must be handled.

My invention is illustrated more or less diagrammatically in the accompanying drawings, wherein—

Figure 1 is a diagrammatic view showing one form of the exemplification of my solution of the problem;

Figure 2 is a section along the line 2—2 of Figure 1;

Figue 3 is a view similar to Figure 1 showing a different solution of the problem having, however, features of similarity.

Like parts are indicated by like characters throughout the specification and drawings.

A is a dust collector adapted to take out substantially one hundred percent of the dust from the air. $A^1$ is a passage leading therefrom to a fan or blower $A^2$ driven by a motor $A^3$. This fan or blower $A^2$ discharges through a passage $A^4$ into a plenum chamber $A^5$. It will be noted that this plenum chamber is of relatively large cross sectional area; so large that air as it passes through it having been forced thereinto by the blower $A^2$ will always move at relatively low velocity. $A^6$ $A^6$ are a series of coal separating tables or decks fed from the plenum chamber $A^5$ through conduits $A^7$ discharging into évasé chimneys $A^8$ which in turn discharge and conduct air through the screen or deck $A^6$. $A^9$ $A^9$ are hoods overlying each deck extending down thereabout but so disposed that there is a certain amount of clearance between the deck and the hood. $A^{10}$ is a dust manifold adapted to draw dust laden air from each of the hoods $A^9$ and conduct it though the pipe $A^{11}$ and discharge it into the suction side of the blower $A^{12}$ driven by the motor $A^{13}$.

The blower $A^{12}$ discharges through a pipe B into a plenum chamber $B^1$. The blower $A^{12}$ and the plenum chamber $B^1$ are of larger capacity than the blower $A^2$ and the plenum chamber $A^5$ because the blower and plenum chamber must handle and contain not merely the air that is handled and contained by and in the blower $A^2$ and chamber $A^5$ but that air plus twenty percent or more additional which has entered into the system through the hoods associated with each of the tables $A^6$. $B^2$ $B^2$ are cleaning tables or decks preferably adapted to handle larger coal and requiring more air than the decks $A^6$. These decks are supplied with air under pressure from the plenum chamber or conduit $B^1$ through the pipes $B^3$ and évasé chimney $B^4$. The fact that these tables require more air than the tables $A^6$ is provided for by the fact that we have now available in the plenum chamber or conduit $B^1$ more air than we had in the plenum chamber or conduit $A^5$ because of the makeup which comes in between each hood and its table. $B^5$ $B^5$ are a series of hoods associated with the tables $B^2$ communicating with the exhaust manifold $B^6$ which in its turn discharges to the intake side of the fan $B^7$ whence the air is drawn into the plenum chamber $B^8$.

The air is drawn from the plenum chamber $B^8$ through the blowers C discharged thereby through the passages $C^1$, the évasé chimney $C^2$, the deck $C^3$ to take care of larger sizes of coal having an even larger air requirement. This deck $C^3$ is enclosed by the hood $C^4$ and the suction manifold $C^5$ leads from each of the said hoods and communicates with the dust pipe $C^6$. This dust pipe extends to and discharges into the suction side of the blower $C^7$ and thence is discharged into the dust arrester A from which part of the dust laden air is drawn. The balance escaping out from the pipe $C^8$ is dust free air.

The above discussion concerns itself only with the air originating in the cleaning system. The device, however, is intended to be used in connection with plants where there are other sources of dust laden air. These have been illustrated more or less generally wherein D indicates an Arms classifying screen such as adapted to separate the coal into various sized classes such as are fed to the various tables. Air is drawn from the hood D associated with the screen through the conduit $D^1$ and discharged through the conductor $C^6$, since it is under suction it draws the dust laden air in from the Arms screen to discharge it to the dust arrester. $D^2$ represents a hood, over a so-called Marcus conveyor and picking screen. Dust is drawn from this hood through the conduit $D^3$ and may be discharged thence from the conduit $D^4$ to the conductor $C^6$ whence it goes to the dust arrester or if it is necessary to have additional air for make up in the second battery of screens, the dust laden air will be passed through the duct $D^5$ to the intake side of the blower $A^{12}$. On the other hand, in connection with the plenum chamber $B^8$ we might have an excess of air from the intermediate battery for what was needed for the coarse size battery of tables in which case air could lead out from the plenum chamber $B^8$ to the pipe $D^6$ over the valve $D^7$ to discharge again into the conduit $C^6$.

Obviously it might be possible to dispense with some of the fans here shown. Under some conditions a connection between the manifold $B^6$ and the plenum chamber $B^8$ might take the form of a simple conduit, though of course this would result in changing the plenum chamber from a pressure chamber as it is shown in Figure 1 to a suction chamber and this would of course make it impossible to bleed off air therefrom to the conduit $D^6$ as is shown. The same situation might prevail in connection with the blowers $A^2$ and $C^7$; in some conditions blower $A^2$ could be dispensed with.

The essential characteristic of this arrangement is that the tables are arranged in a series of groups, all the tables in a group receiving their air from a single air source and discharging their spent air from hoods above each table to a single discharge receiving member. The air so discharged may be then used to furnish air for a next series of tables or may be passed through a dust arrester as the case may be but the general arrangement is such that we have interposed between groups of tables pressure manifolds and suction manifolds so arranged that the general path of air is from that part of the system where the tables require a small amount of air through the system and through the table gradually increasing in air requirement back to a dust collector from which some of the air returns to the system and the remainder is discharged from it.

In a somewhat similar but modified form shown in Figure 3 the dust collector E provides pure air which passes out through the pipe $E^1$ to a blower $E^2$ driven by a motor $E^3$. The blower provides air under pressure to the plenum chamber or manifold $E^4$. This manifold provides air through the pipes $E^5$ to the tables $E^6$. The spent air is caught in the hoods $E^7$ and drawn up into the dust collecting manifold $E^8$, which manifold is under an inactive pressure owing to the fact that the blowers $E^9$ $E^{10}$ are drawing air out of it. These blowers discharge air into the manifolds or plenum chambers $E^{11}$ $E^{12}$ from which the air is discharged from the pipes $E^{13}$ $E^{14}$ to the decks $E^{15}$ $E^{16}$. From the decks $E^{15}$ the air is caught in the hoods $E^{17}$ and sucked into the dust collecting manifold $E^{18}$.

The blower F draws the air out of the manifold $E^{18}$ discharging into the pressure manifold $F^1$ whence it is forced into the decks $F^2$, hoods $F^3$ and into the suction manifold $F^4$ which communicates with the main suction pipe $F^5$, the blower $F^6$ drawing dust laden air out of that pipe and discharging it into the dust arrester E. The dust collecting manifold $F^7$ is fed from the hoods $F^8$ associated with the tables $E^{16}$. Air being drawn into that manifold by the blower $F^9$ is discharged therefrom into the pipe $F^5$.

The auxiliary apparatuses in the house are taken care of by hoods G, associated in this case with two Arms screens, and the hood $G^1$ in the Marcus house both of which discharge through pipes $G^2$ $G^3$ respectively into the suction pipe $F^5$, and by the hood $G^4$ discharging through a pipe $G^5$ either into the suction pipe $F^5$ or into the dust collecting manifold $E^8$ as the case may be to provide additional make-up air at that point.

As illustrating the actual operation of devices such as this, we refer to Figure 1. We find that each of the tables $A^6$ requires five thousand cubic feet of air. Therefore the blower $A^2$ must furnish twenty thousand cubic feet to the plenum chamber. There will be drawn out of each of the hoods $A^9$ six thousand feet of air so that a total of twenty-four thousand cubic feet from the hoods $A^9$ is forced by the blower $A^{12}$ into the plenum chamber $B^1$. It happens, however, that this is not enough for the next stage in the system and so we draw two thousand feet from the hood $D^2$ over the Marcus chutes giving us a total of twenty-six thousand feet forced into the plenum chamber $B^1$. The two decks $B^2$ on the left require five thousand feet each, the two decks $B^2$ on the right require eight thousand feet each which makes our twenty-six thousand feet. From the two hoods $B^2$ on the left is drawn six thousand feet, that includes the five thousand feet forced into the deck and a thousand feet leakage in and around the hood. From the two hoods on the right is drawn ninety-six thousand feet each or a total of 31,200 feet forced by the blower $B^7$ into the manifold $B^8$. The two decks receiving air from the manifold $B^8$, however, only need the one on the right 12,000 feet, the one on the left 10,000 or a total of 22,000 feet, therefore, the 9,200 feet passes out through the pipe $D^6$ into the pipe $C^6$ where it joins the 6,000 feet drawn from the Arms screen from the hood D, the 26,400 discharged from the hoods $C^4$ made up 14,400 from the left hand hood and 12,000 from the right hand hood, all of which dust laden air plus 3,000 feet in addition drawn from the hood $D^2$ through the pipe $D^4$ is forced by the fan $C^7$ into the dust arrester. The total amount of air thus displaced being 44,600 feet. Since the air required for the manifold $A^5$ is only 20,000 feet there is discharged from the dust arrester 24,600 feet.

It will be noted in this arrangement that the biggest fan in the system, the one that takes all the dust laden air there is and feeds it to the dust arrester only displaces 44,600 feet. If the air was not reduced as indicated, this dust separator fan would have to handle 26,000 feet from the A⁶ tables in the first battery, 31,200 feet from the B² tables in the second battery, 26,400 from the two C³ tables in the third battery, 6,000 feet from the Arms screen hood D and 5,000 feet from the auxiliary Marcus and other chutes and hoods D² or a total of 94,600 feet of air. In other words by reducing this air we more than cut in half the amount of air which must be circulated through the dust arrester, thereby reducing the size of the dust arrester and the power required to operate it.

A similar analysis of the arrangement set out in Figure 3 is hardly worth making. Suffice it to say, that in this arrangement the fan F⁶ discharges into the dust arrester 61,000 cubic feet of air. Against this the fan would have to handle a maximum 112,600 feet if my arrangement were not used.

It will be noted that there is involved in each of these two systems or in any system made according to this general plan, a series of manifolds or plenum chambers where low air velocity prevails. These plenum chambers containing as they do dust laden air furnish an especially effective separating zone where the velocity carried dust may be separated out. The very fine floating dust is not separated but relatively large particles such as may have been drawn out by the air blast drop to the bottom and are carried out by the screw conveyors which are located in the bottoms of these manifolds as are indicated by letter H in Figure 3.

I claim:

1. In a coal cleaning system a plurality of separate groups of air cleaning tables, a single means for supplying air under pressure to the tables of the first group, a single means for withdrawing the spent dust laden air from the first group and for supplying such air under pressure to the tables of the next group.

2. In a coal cleaning system a plurality of separate groups of air cleaning tables, a single means for supplying air under pressure to the tables of the first group, a single means for withdrawing the spent dust laden air from the first group and for supplying such air under pressure to the tables of the next group and a single means for withdrawing all the spent dust laden air from the tables of the next group.

3. In a coal cleaning system a plurality of separate groups of air cleaning tables, a single means for supplying air under pressure to the tables of the first group, a single means for withdrawing the spent dust laden air from the first group and for supplying such air under pressure to the tables of the next group, a dust collector and a single means for withdrawing all the spent dust laden air from the tables of the next group and discharging it into the dust collector.

4. In a coal cleaning system a plurality of separate groups of air cleaning tables, a single means for supplying air under pressure to the tables of the first group, a single means for withdrawing the spent dust laden air from the first group and for supplying such air under pressure to the tables of the next group, a dust collector and a single means for withdrawing all the spent dust laden air from the tables of the next group and discharging it into the dust collector, and means for furnishing cleaned air from the dust collector to the air supply means for the tables of the first group.

5. In a coal cleaning system, a plurality of separate groups of air cleaning tables, means for supplying air to them in series relation comprising, a conduit communicating with the tables of the first group, means for forcing air under pressure into such conduit, a suction manifold communicating with the tables of the first group and means for withdrawing spent dust laden air from the tables through such manifold.

6. In a coal cleaning system, a plurality of separate groups of air cleaning tables, a conduit communicating with all the tables of the first group, means for forcing air under pressure into such conduit, a suction manifold communicating with all the tables of the first group and means for withdrawing spent dust laden air from all the tables through such manifold, a conduit communicating with all the tables of the second group, means for discharging the air drawn through the manifold under pressure into the second conduit, a second suction manifold communicating with tables of the second group and means for drawing spent dust laden air therethrough from such tables.

7. In a coal cleaning system, a plurality of separate groups of air cleaning tables, a conduit communicating with all the tables of the first group, means for forcing air under pressure into such conduit, a suction manifold communicating with all the tables of the first group and means for withdrawing spent dust laden air from all the tables through such manifold, a conduit communicating with all the tables of the second group, means for discharging the air drawn through the manifold under pressure into the second conduit, a second suction manifold communicating with tables of the second group and means for drawing spent dust laden air therethrough from such tables, a dust arrester and means for discharging the dust laden air from the second manifold into the dust arrester.

8. In a coal cleaning system, a plurality of separate groups of air cleaning tables, a conduit communicating with all the tables of the first group, means for forcing air under pressure into such conduit, a suction manifold communicating with all the tables of the first group and means for withdrawing spent dust laden air from all the tables through such manifold, a conduit communicating with all the tables of the second group, means for discharging the air drawn through the manifold under pressure into the second conduit, a second suction manifold communicating with tables of the second group and means for drawing spent dust laden air therethrough from such tables, a dust arrester and means for discharging the dust laden air from the second manifold into the dust arrester, and means for supplying cleaned air from the dust arrester to the air forcing means which furnish air to the first named conduit.

9. In a coal cleaning system, a plurality of air cleaning tables having different air requirements and means for forcing air therethrough and withdrawing spent dust laden air therefrom, a dust arrester adapted to receive spent dust laden air from that part of the system where the air requirement is greatest and to supply cleaned air to that part of the system where the air requirement is least, the air forcing and withdrawing means being so arranged that dust laden air from tables of less requirement is supplied to tables of greater requirement so that only the amount of air discharged from the zone of greatest air requirement passes through the dust arrester, conduits leading from those parts of the system other than the tables where dust is generated adapted to draw dust laden air to and pass it through the dust arrester.

10. In a coal cleaning system, a plurality of groups of air cleaning tables, a dust arrester, separate pressure chambers and separate suction chambers associated with each group of tables, means for forcing air into the pressure chambers and for withdrawing dust laden air from the suction chambers, the dust laden air passing from a suction chamber to a pressure chamber whereby the air is re-used passing through a plurality of tables in series.

11. In a coal cleaning system, a plurality of groups of air cleaning tables, a dust arrester, separate pressure chambers and separate suction chambers associated with each group of tables, means for forcing air into the pressure chambers and for withdrawing dust laden air from the suction chambers, the dust laden air passing from a suction chamber to a pressure chamber whereby the air is re-used passing through a plurality of tables in series, a dust arrester and conduits leading from the last suction chamber in the system to the dust arrester and from the dust arrester to the first pressure chamber in the system whereby some of the air is continuously circulated through the system.

12. In a coal cleaning system, a plurality of groups of air cleaning tables, means for supplying air to them in series relation including a dust arrester, a separate conduit adapted to supply air under pressure to the tables of each group, a separate dust collecting suction manifold associated with the tables of each group, and mechanical means for withdrawing dust settled out of the air in each said dust collecting manifold, the arrangement being such that the presence of the separate dust collecting manifold in the series for each group prevents an overload of dust in the air supplied to any of the groups.

13. In a coal cleaning system, a plurality of groups of air cleaning tables, means for supplying air to them in series relation including a dust arrester, a separate conduit adapted to supply air under pressure to the tables of each group, a separate dust collecting suction manifold associated with the tables of each group, and mechanical means for withdrawing dust settled out of the air in each said dust collecting manifold, means for supplying cleaned air from the dust arrester to the first conduit of the system, the arrangement being such that the presence of the separate dust collecting manifold in the series for each group prevents an overload of dust in the air supplied to any of the groups.

14. In a coal cleaning system, a plurality of groups of air cleaning tables, a dust arrester, a separate conduit adapted to supply air under pressure to the tables of each group, a separate dust collecting suction manifold associated with the tables of each group, and mechanical means for withdrawing dust settled out of the air in each said dust collecting manifold, means for supplying cleaned air from the dust arrester to the first conduit of the system, means for supplying partially cleaned air from the successive dust collecting manifolds to the next conduit in the series.

15. In a coal cleaning system, a plurality of groups of air cleaning tables, a dust arrester, a separate conduit adapted to supply air under pressure to the tables of each group, a separate dust collecting suction manifold associated with the tables of each group, and mechanical means for withdrawing dust settled out of the air in each said dust collecting manifold, means for supplying cleaned air from the dust arrester to the first conduit of the system, means for supplying partially cleaned air from the successive dust collecting manifolds to the next conduit in the series, a main suction conduit, means for drawing air therethrough and discharging it into the dust arrester.

16. In a coal cleaning system, a plurality of groups of air cleaning tables, a dust arrester, a separate conduit adapted to supply air under pressure to the tables of each group, a separate dust collecting suction manifold associated with the tables of each group and mechanical means for withdrawing dust settled out of the air in each said dust collecting manifold, means for supplying cleaned air from the dust arrester to the first conduit of the system, means for supplying partially cleaned air from the successive dust collecting manifolds to the next conduit in the series, a main suction conduit, means for drawing air therethrough and discharging it into the dust arrester, connections between such conduit and some of the dust collecting manifolds whereby all the dust laden air leaving the system is discharged into the dust arrester.

17. In a coal cleaning system, a plurality of groups of air cleaning tables, a dust arrester, a separate conduit adapted to supply air under pressure to the tables of each group, a separate dust collecting suction manifold associated with the tables of each group and mechanical means for withdrawing dust settled out of the air in each said dust collecting manifold, means for supplying cleaned air from the dust arrester to the first conduit of the system, means for supplying partially cleaned air from the successive dust collecting manifolds to the next conduit in the series, a main suction conduit, means for drawing air therethrough and discharging it into the dust arrester, connections between such conduit and some of the dust collecting manifolds whereby all the dust laden air leaving the system is discharged into the dust arrester, hoods associated with all of the dust generating elements of the plant, conduits leading from said hoods and discharging into the main dust collecting pipes.

Signed at Chicago, county of Cook, and State of Illinois, this 20th day of August, 1928.

RAY W. ARMS.